US008210616B2

United States Patent
Schwartz

(10) Patent No.: US 8,210,616 B2
(45) Date of Patent: Jul. 3, 2012

(54) FAUX WOOD BUILDING MATERIALS AND ARTICLES THEREFROM

(75) Inventor: Larry Schwartz, Boca Raton, FL (US)

(73) Assignee: Envio Products, LLC, Boca Raton, FL (US)

( * ) Notice: Subject to any disclaimer, the term of this patent is extended or adjusted under 35 U.S.C. 154(b) by 0 days.

(21) Appl. No.: 12/869,066

(22) Filed: Aug. 26, 2010

(65) Prior Publication Data

US 2011/0049959 A1    Mar. 3, 2011

Related U.S. Application Data

(60) Provisional application No. 61/275,191, filed on Aug. 26, 2009.

(51) Int. Cl.
*A47C 7/16* (2006.01)
*A47C 5/12* (2006.01)
(52) U.S. Cl. .......... 297/452.64; 297/452.63; 297/451.11
(58) Field of Classification Search ............ 297/452.13, 297/452.56, 452.63, 452.64, 451.11
See application file for complete search history.

(56) References Cited

U.S. PATENT DOCUMENTS

| | | | |
|---|---|---|---|
| 3,720,572 A | 3/1973 | Soda et al. | |
| 3,888,810 A | 6/1975 | Shinomura | |
| 3,935,947 A | 2/1976 | Barrett | |
| 4,469,738 A * | 9/1984 | Himelreich, Jr. | 297/452.64 X |
| 4,469,739 A * | 9/1984 | Gretzinger et al. | 297/452.64 X |
| 4,927,579 A | 5/1990 | Moore | |
| 5,088,910 A | 2/1992 | Goforth et al. | |
| 5,096,046 A | 3/1992 | Goforth et al. | |
| 5,704,690 A * | 1/1998 | Schwartz | 297/452.64 X |
| 5,845,970 A * | 12/1998 | Schwartz | 297/452.64 X |
| 5,866,641 A | 2/1999 | Ronden et al. | |
| 5,879,608 A | 3/1999 | Lammeck et al. | |
| 5,925,687 A | 7/1999 | Guettes et al. | |
| 6,156,811 A | 12/2000 | Lammeck et al. | |
| 6,228,199 B1 | 5/2001 | Balaba et al. | |
| 6,540,950 B1 * | 4/2003 | Coffield | 297/452.64 X |
| 6,669,301 B1 | 12/2003 | Funk et al. | |
| 6,706,381 B2 | 3/2004 | Balaba et al. | |
| 6,863,972 B2 | 3/2005 | Burger et al. | |
| 6,966,606 B2 * | 11/2005 | Coffield | 297/452.56 |
| 7,175,235 B2 * | 2/2007 | Schwartz | 297/452.64 |
| 7,237,845 B2 * | 7/2007 | Mulmed | 297/452.63 X |
| 7,252,331 B1 * | 8/2007 | Walton | 297/452.64 X |
| 7,347,493 B2 * | 3/2008 | Mulmed | 297/452.63 X |
| 7,347,499 B2 * | 3/2008 | Slabaugh et al. | 297/452.56 |

(Continued)

OTHER PUBLICATIONS

Knox, Continuous Fiber Reinforced Thermoplastic Composites in the Automotive Industry, www.speautomotive.com/SPEA_CD/SPEA2001/.../H1, date not known.

(Continued)

*Primary Examiner* — Rodney B White
(74) *Attorney, Agent, or Firm* — Lerner, David, Littenberg, Krumholz & Mentlik, LLP

(57) ABSTRACT

Building materials formed from synthetic polymer materials have an appearance which simulates natural woods. The building materials may be used in the construction of fences, sheds, decking materials, indoor/outdoor furniture, railings and numerous other products. The faux wood material is constructed to include reinforcing fibers and voids for weight reduction. The aesthetic appearance of the finished product can be enhanced by applying a color wash which includes a polymer component and a color component adhering to the surface of the material.

36 Claims, 3 Drawing Sheets

U.S. PATENT DOCUMENTS

| | | | |
|---|---|---|---|
| 7,472,961 B2 | 1/2009 | Schwartz et al. | |
| 7,476,630 B2 * | 1/2009 | Schwartz et al. | 297/452.64 X |
| 7,740,322 B2 * | 6/2010 | Burch | 297/452.57 |
| 7,750,091 B2 | 7/2010 | Maljkovic et al. | |
| 7,794,022 B2 * | 9/2010 | Caruso et al. | 297/452.56 |
| 7,823,979 B2 * | 11/2010 | Schwartz et al. | 297/452.64 X |
| 2008/0004374 A1 | 1/2008 | Faulkner | |
| 2010/0127551 A1 * | 5/2010 | Heidmann et al. | 297/452.63 X |
| 2010/0179237 A1 | 7/2010 | Bertelo et al. | |

OTHER PUBLICATIONS

Naguib et al., Knox, Polymer Engineering and Science, Jul. 2002.

\* cited by examiner

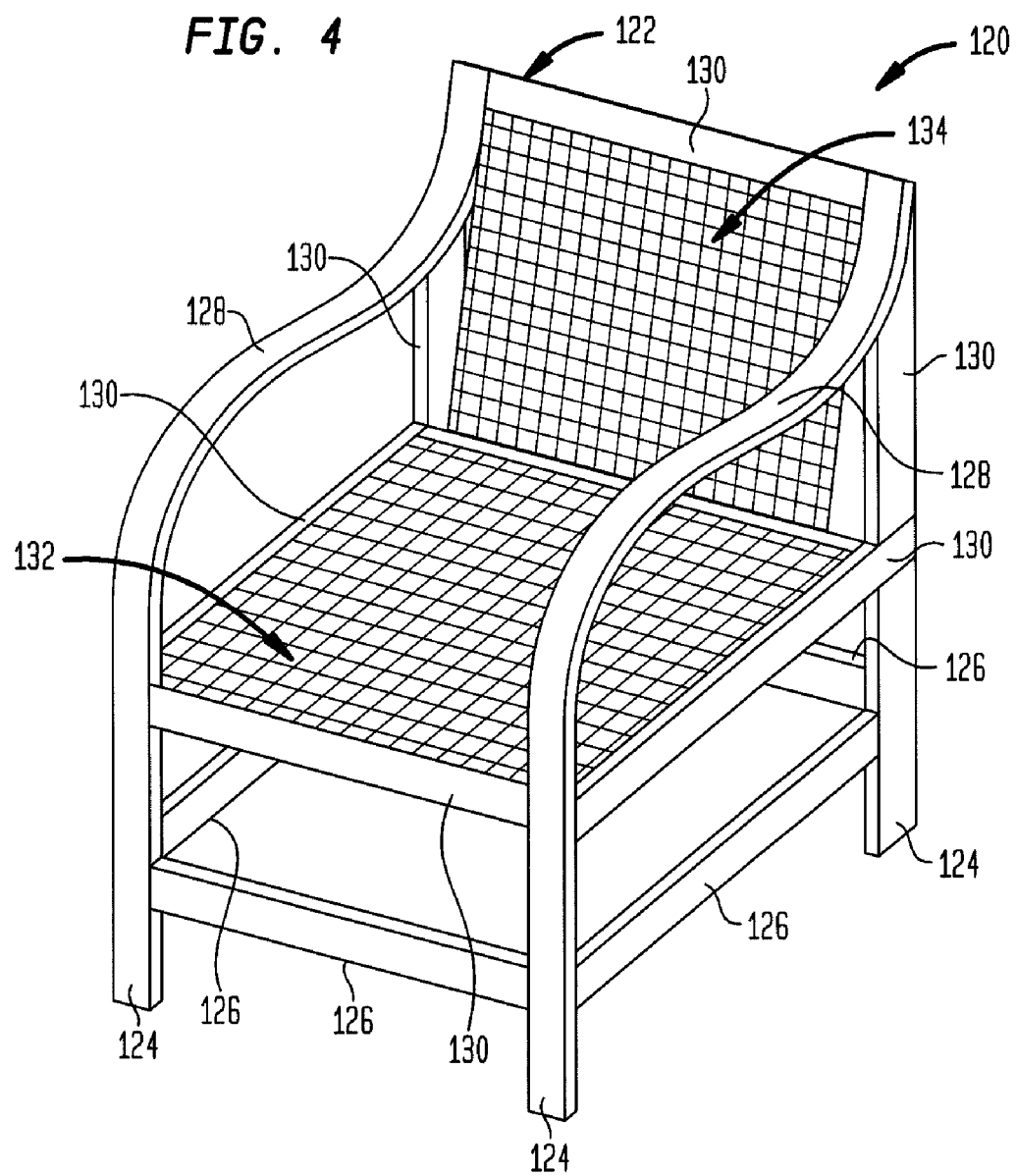

FAUX WOOD BUILDING MATERIALS AND ARTICLES THEREFROM

CROSS-REFERENCE TO RELATED APPLICATIONS

This application claims the benefit of the filing date of the U.S. Provisional Patent Application No. 61/275,191, filed Aug. 26, 2009, entitled "Faux Wood Building Materials," the disclosure of which is hereby incorporated herein by reference.

BACKGROUND OF THE INVENTION

The present invention relates in general to faux wood building materials, and more particularly, to building materials formed from synthetic polymer materials having an appearance which simulate natural woods.

Natural wood, due to its strength and aesthetic characteristics has been used in the construction of various products for both indoor and outdoor application. For example, wood such as oak, maple and pine have been used for indoor cabinetry, flooring material, furniture products and other items. Cedar and teak have found applications for patio furniture for both indoor and outdoor use. Natural wood is a versatile product that has extensive applications for construction of fences, sheds, decking material, indoor/outdoor furniture, railings and numerous other products.

Natural wood is a highly desirable building material for various products due to its richness. However, some woods are less suitable for certain products and use in outdoor environments which are subject to wet conditions. For example, teak and cedar are commonly used for outdoor furniture due to their weather resistance characteristics. However, even these wood products are susceptible to discoloration, splitting and other effects caused by the outdoor environment. In addition, woods like teak are expensive and are environmentally protected in certain regions.

Various synthetic polymers have been extruded or molded into flat boards for use in the construction of outdoor furniture, such as Adirondack chairs, picnic tables, picnic benches and other outdoor products. However, the constructions of these products from synthetic polymer material evidences a synthetic plastic look which is less attractive compared to natural wood materials.

There is therefore a need for the construction of synthetic plastic material which simulates natural wood to provide the richness and desirable aesthetic characteristics of wood products.

BRIEF SUMMARY OF THE INVENTION

The present invention describes a synthetic polymer building material which simulates a wood product, yet due to its synthetic nature, is suitable for outdoor use in harsh environments such as sun, rain and snow.

The material of the present invention can be formed from a number of synthetic polymer materials which can easily be fabricated into various shapes such as elongated boards, as well as other geometric shapes such as oval, polygonal, circular and the like. The materials incorporate reinforcement elements such as fibers to enhance the mechanical strength of the resulting product. To decrease the weight of the materials, a blowing agent is blended with the synthetic material during the manufacturing process. The blowing agent in addition to creating voids within the material, may also have the effect of forming a slightly uneven exterior surface which enhances the natural appearance or wood simulating effect of the material.

The polymers may include various color components which result in the material having a solid color or other effects such as marble look, striations or the like. In the preferred embodiment, the resulting product is coated with a color wash of suitable synthetic polymer material which bonds to the base material. The wash may be applied uniformly, randomly or selectively to create various aesthetic effects.

In one embodiment of the present invention there is described an article of furniture comprising a frame comprising a body of synthetic polymer material having reinforcement elements dispersed therein, and a plurality of voids within the body whereby the weight of the frame is reduced; and a seat portion coupled to the frame for supporting an occupant.

The article of furniture further includes a backrest portion coupled to the frame, wherein at least one of the seat portion or the backrest portion comprises a woven panel from a plurality of synthetic polymer yarns. The article further includes a wash having a polymer component and a color component adhered to at least a portion of a surface of the frame. The plurality of voids reduces the weight of the frame by about 10% or greater.

In another embodiment of the present invention there is described an article of furniture including recycled scrap synthetic polymer material, comprising a frame in the shape of an article of furniture comprising a body of synthetic polymer material having reinforcement elements dispersed therethrough, a plurality of voids within the body whereby the weight of the frame is reduced; and a portion of the synthetic polymer material made from recycled scrap synthetic polymer material having the reinforced elements dispersed therethrough and the plurality of voids therein.

In another embodiment of the present invention there is described an article of furniture comprising a frame comprising a body of synthetic polymer material having reinforced fibers dispersed therethrough, a plurality of voids within the body whereby the weight of the frame is reduced by about 10% or greater, and a wash having a polymer component and a color component adhered to at least a surface of the frame; a seat portion coupled to the frame for supporting an occupant; and a backseat portion coupled to the frame, at least one of the seat portion or the backrest portion comprising a woven panel from a plurality of synthetic polymer yarns.

The article of furniture where the color of the frame is different from the color of the color component; and wherein the seat portion and the backrest portion are formed as a bucket seat attached to the frame.

In another embodiment of the present invention there is described a building material comprising a body of synthetic polymer material having reinforcement fibers disbursed therein; a plurality of voids within the body whereby the weight of the body is reduced by at least 10%; and a wash having a polymer component and a color component adhered to at least a portion of the body.

BRIEF DESCRIPTION OF TEE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 4 is a perspective view of an article of furniture constructed from the materials of the present invention in accordance with one embodiment thereof.

DETAILED DESCRIPTION

Figure 1:
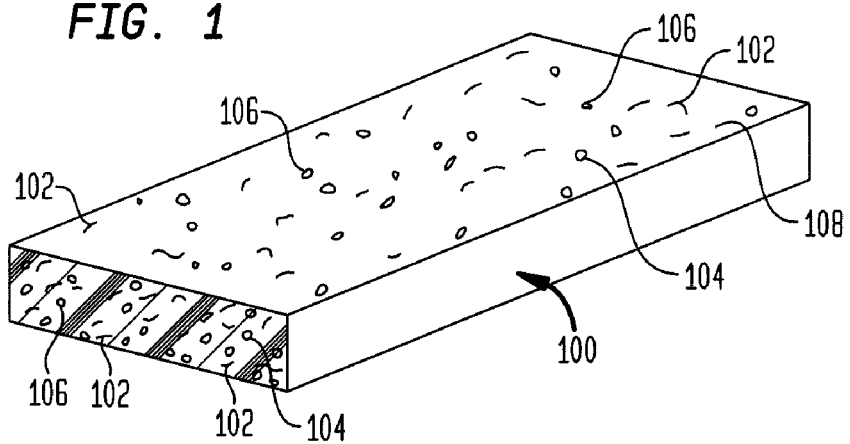
FIG. 1 is a perspective view of a segment of a building material in the nature of simulated wood plank or board constructed in accordance with one embodiment of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Referring to the drawings, wherein like reference numerals represents like elements, there is shown in FIG. 1 a section of an elongated board or plank constructed in accordance with one embodiment of the present invention, and designated generally as reference numeral 100. The board 100 is formed from synthetic polymer material and mixture thereof which possesses suitable characteristics for its intended use. For example, for various applications such as indoor and outdoor furniture, thermoplastic materials such as polystyrene, polyvinyl chloride, polyethylene and polypropylene are contemplated. The preferred material is polystyrene. The board 100 can be made using conventional die extrusion techniques. It is also contemplated that thermoset polymer materials may be used for creating objects that can be molded into predetermined shapes. Thus, it should be understood that a wide variety of synthetic polymer materials may be used in constructing the materials of the present invention.

To provide additional mechanical strength, the polymer material may be mixed with reinforcement elements such as fibers 102 as is known in the art of reinforcement of synthetic polymers. The fibers can be constructed as short elongated segments in the nature of fine filaments, or other desirable forms as is known in the reinforcement of synthetic polymers. The fibers can be constructed from a variety of materials, for example, synthetic polymers, fiberglass, carbon, metal and the like. The percentage of loading of the material with the fibers will be dictated by the polymer material composition, as well as the intended application for the finished material, and the load bearing and mechanical strength requirements.

In manufacturing the board 100, a blowing agent is also included in order to form voids within the material thereby reducing weight. Blowing agents are commonly used for this purpose as is known in the synthetic polymer processing industry. Suitable blowing agents and their use are known in the polymer arts. The amount of the blowing agent is generally sufficient to reduce the weight of the material by, for example, about 10% or greater. As the amount of voids within the material decreases the mechanical strength, the amount of blowing agent used will be dependent upon the mechanical strength required of the resulting material based on its intended application.

As shown in FIG. 1, the blowing agent forms voids 104 within the cross-section of the material, and potentially small pits 106 randomly dispersed on the exterior surface of the finished board 100. In addition, it is contemplated that the blowing agent may result in the surface 108 of the board 100 to have a slightly irregular planar surface. It is also contemplated that some of the fibers 102 may be visible randomly across the surface of the board 100. Thus, depending upon on the loading extent of the fibers 102 and the extent of the blowing agent, fibers 102 and pits 106 may or may not appear on the surface of the board 100. Likewise, the extent of the unevenness or irregularity of the surface of the board 100 will be dependent upon the extent of the blowing agent used.

Figure 2A:
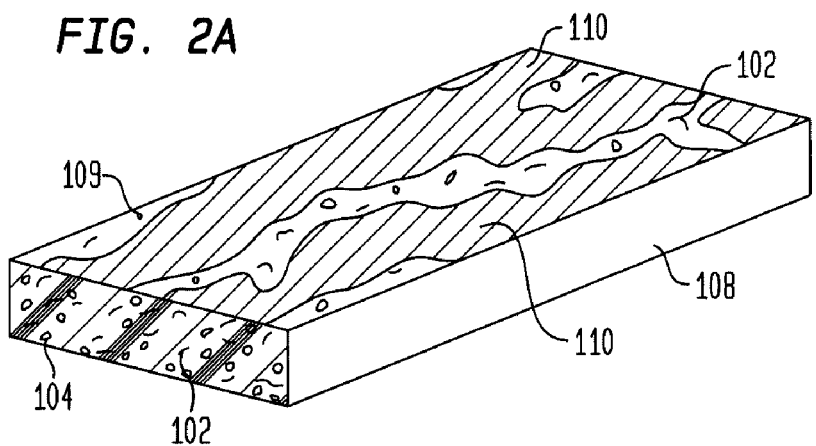
FIGS. 2A and 2B are perspective views of a segment of a building material in the nature of a simulated wood plank or board constructed in accordance with other embodiments of the present invention.

Referring to FIG. 2A, there is illustrated a board 108 constructed in accordance with another embodiment of the present invention. The board 108 differs from the board 100 by the inclusion of a wash 110 over the exterior surfaces of the board to provide a more faux wood appearance. The wash 110 is in the nature of a coating or paint composition which adheres or bonds to the surface of the material forming the board 108. The wash composition typically will include a polymer film forming component, a solvent, and a color component. A variety of colors may be used. The solvent typically will be suitable for dissolving the polymer component, as well as being a solvent for the material forming the board 100. In a preferred embodiment, the polymer component will also be the same polymer used for constructing the board 100. In this manner, the wash will adhere strongly to the surface of the board 100. Examples of suitable wash compositions and methods of applying same to a synthetic polymer material are disclosed in U.S. Pat. No. 7,472,961, the disclosure of which is incorporated herein by reference, and a copy of which is attached hereto.

As shown in FIG. 2A, the wash is bonded over only a portion of the surface of the board 108, allowing underlying portions of the board to be exposed. The wash 110 may be applied over the entire surface of the board 108, and selected and/or random portions removed using a suitable solvent and optionally a rag for removing the wash. In such case, the pits 106 will be filled with the wash composition, becoming filled pits 109 taking on the color of the wash. It is also contemplated that the wash 110 may applied randomly on the surface of the board 108 using any suitable technique desired. In the embodiment shown in FIG. 2A, the wash is not uniformly applied to the board 108, creating a random painted effect with the imperfections such as pits 109 and fibers 102 being partially visible on the non-coated areas.

Figure 2B:
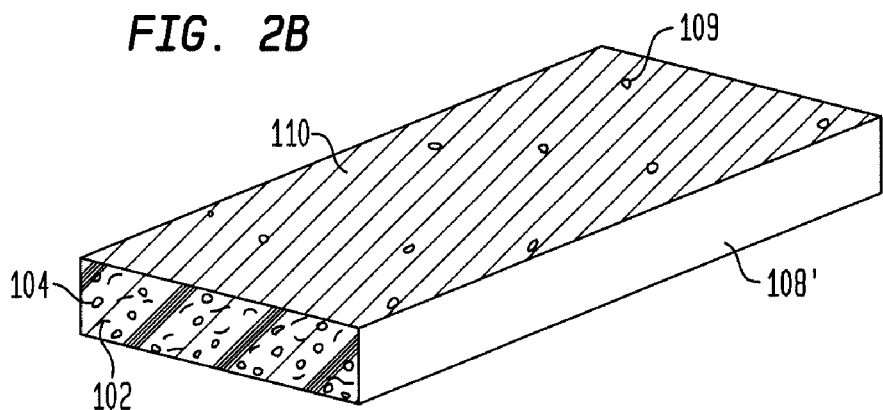

Referring to FIG. 2B, there is shown a board 108' where the wash 100 is applied over the entire surface of the board to form a more uniform coating.

The boards 100, 108, 108' can be constructed in a variety of sizes and shapes. For example, the boards may be rectangular, octagonal, triangular, square, or circular or in other shapes, and continuously extruded in a variety of lengths. The boards may be thick, or thin, depending upon their application. In addition, sheets of the aforementioned material may be formed, and various shapes cut from the sheets as desired. The scrap material by virtue of using thermoplastic material can be recycled. The boards, as previously noted, can be used in a variety of applications, for example, for construction of fences, barns, sheds, indoor and outdoor furniture, patio furniture, frame for chairs, and the like. The surface of the boards in addition to including a wash 110, may also be machine finished such as having a hammer finish, or using other tooling and engraving machines to create various irregularities or patterns in the surface.

Figure 3:
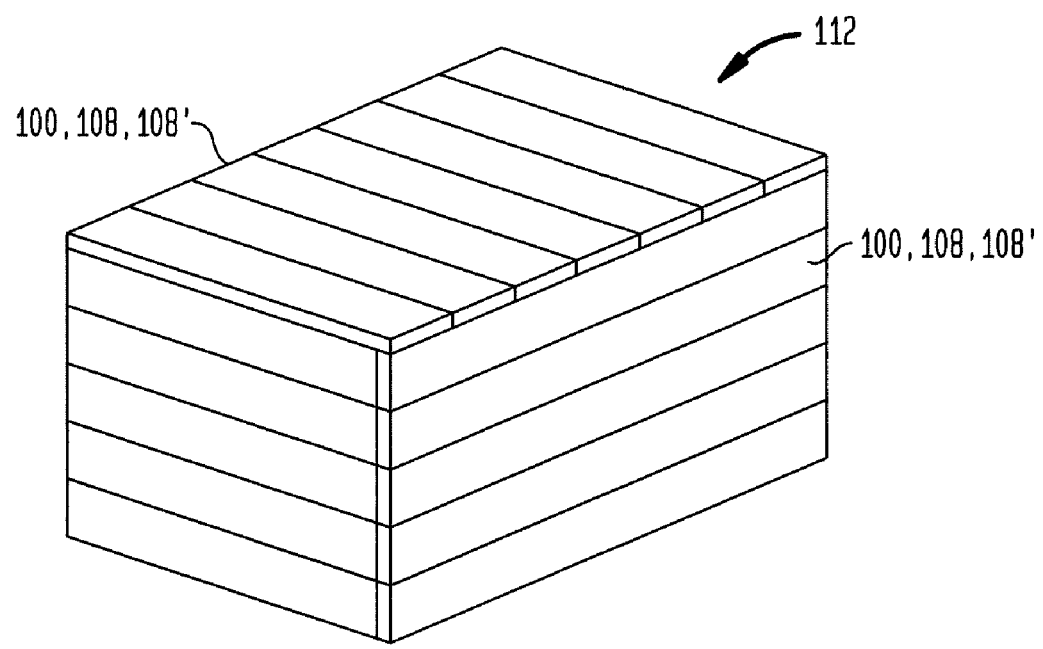
FIG. 3 is a perspective view of an outdoor storage chest constructed from the materials of the present invention in accordance with one embodiment thereof.

Turning to FIG. 3, there is illustrated a storage chest 112 constructed from any one of or combination of the boards 100, 108, 108' as previously described. The boards are used as conventional wood boards. In this regard, the boards 100, 108, 108' can be cut using conventional sawing techniques, and drilled with holes as may be required. The boards may be attached together using screws intended for plastic materials. In addition, it is also contemplated that adhesives may be used to join the boards together.

Turning now to FIG. 4, there is illustrated an article of furniture in the nature of a chair 120 having a frame 122 constructed from the faux wood building materials in accordance with the present invention. By way of illustration only, the frame 122 forms a plurality of legs 124 for supporting the article on an underlying surface. The frame 122 further includes cross braces 126 and, optionally, sidearms 128. In the illustrative embodiment, the sidearms 128 are formed as an extension of the front legs 124. A plurality of cross members 130 delineates a seat portion 132 and backrest portion 134. The seat and/or backrest portions may be formed from a woven panel constructed from a plurality of woven synthetic polymer yarns such as disclosed in, for example, U.S. Pat. No. 7,472,961. The woven panels may be attached directly to portions of the frame 122 or through additional structure which may be attached to the frame 122. For example, the seat and backrest portions 132, 134 may be constructed as a bucket seat which is separately manufactured and assembled to a frame 122 previously assembled using the faux wood building materials disclosed pursuant to the present invention.

Although the invention herein has been described with reference to particular embodiments, it is to be understood that these embodiments are merely illustrative of the principles and applications of the present invention. For example, it is not required that the boards have a faux wood appearance. Rather, the wash may be applied to provide any other appearance that may be desired. In addition, the boards may be used without a wash. In another aspect of the present invention, scrap or unused material left over when making articles may be recycled with virgin material for making articles therefrom. The ability to recycle the scrap material results in the generation of little waste material. It is therefore to be understood that numerous modifications may be made to the illustrative embodiments and that other arrangements may be devised without departing from the spirit and scope of the present invention as defined by the appended claims.

The invention claimed is:

1. An article of furniture comprising:
   a rigid frame forming at least a plurality of legs for supporting the article of furniture on a surface, said frame comprising a body of synthetic polymer material having reinforcement elements dispersed therein, and a plurality of voids within said body whereby the weight of said frame is reduced; and
   a seat portion coupled to said frame for supporting an occupant thereon;
   wherein said body of synthetic polymer material having said reinforcement elements and said plurality of voids therein provides a composite composition which when formed into said plurality of legs is sufficiently weight bearing for supporting an occupant on said seat portion.

2. The article of claim 1, further includes a backrest portion coupled to said frame.

3. The article of claim 2, wherein at least one of said seat portion or said backrest portion comprises a woven panel from a plurality of synthetic polymer yarns.

4. The article of claim 2, wherein said seat portion and said backrest portion comprises a woven panel from a plurality of synthetic polymer yarns.

5. The article of claim 1, wherein said elements comprise fibers.

6. The article of claim 1, wherein said frame has the shape of a chair.

7. The article of claim 6, wherein said frame forms sidearms for said chair.

8. The article of claim 1, further including a wash having a polymer component and a color component adhered to at least a portion of a surface of said frame.

9. The article of claim 1, wherein the plurality of voids reduces the weight of said frame by about 10% or greater.

10. The article of claim 1, wherein at least a portion of said synthetic polymer material comprises recycled synthetic polymer material having said reinforcement elements dispersed therein and said plurality of voids therein.

11. An article of furniture comprising:
   a rigid frame forming at least a plurality of legs for supporting the article of furniture on a surface, said frame comprising a body of synthetic polymer material having reinforced fibers dispersed therethrough, a plurality of voids within said body whereby the weight of said frame is reduced by about 10% or greater, and a wash having a polymer component and a color component adhered to at least a surface of said frame;
   a seat portion coupled to said frame for supporting an occupant; and
   a backrest portion coupled to said frame, at least one of said seat portion or said backrest portion comprising a woven panel from a plurality of synthetic polymer yarns;
   wherein said body of synthetic polymer material having said reinforcement fibers and said plurality of voids therein provides a composite composition which when formed into said plurality of legs is sufficiently weight bearing for supporting an occupant on said seat portion.

12. The article of claim 11, wherein said body has an irregular planar surface.

13. The article of claim 12, wherein said irregular planar surface includes pits therein.

14. The article of claim 11, wherein said polymer component comprises the same synthetic polymer material as said body.

15. The article of claim 11, wherein said polymer component comprises a different synthetic polymer than said synthetic polymer material.

16. The article of claim 11, wherein the color of the color component is different from the color of the frame.

17. The article of claim 11, wherein said frame has the shape of a chair.

18. The article of claim 17, wherein said frame forms sidearms for said chair.

19. The article of claim 17, wherein both said seat portion and said backrest portion are formed from said woven panel.

20. The article of claim 11, wherein at least a portion of said synthetic polymer material comprises recycled synthetic polymer material having said reinforced fibers dispersed therethrough and said plurality of voids therein.

21. The article of claim 11, where a color of said frame is different from the color of said color component.

22. The article of claim 11, wherein said seat portion and said backrest portion are formed as a bucket seat attached to said frame.

23. The article of claim 1, further including a wash having a synthetic polymer component and a color component adhered to at least a portion of a visible surface of said frame, wherein said synthetic polymer component comprises the same synthetic polymer as said synthetic polymer material of said body.

24. The article of claim 1, further includes a wash having a synthetic polymer component and a color component adhered to at least a portion of a visible surface of said frame, wherein said synthetic polymer component comprises a different synthetic polymer as said synthetic polymer material of said body.

25. An article of furniture comprising:
   a rigid frame comprising an elongated body of synthetic polymer material defining a seat region, a backrest region, and a plurality of legs for supporting the frame on an underlying surface, the body having reinforcement elements dispersed therein and a plurality of voids therein whereby the weight of the frame is reduced;
   a seat portion coupled to the frame in the seat region for supporting an occupant;
   a backrest portion coupled to the frame in the backrest region for supporting an occupant;
   wherein at least one of said seat portion or said backrest portion comprises a panel woven from a plurality of synthetic polymer elongated yarns; and
   a wash having a synthetic polymer component and a color component adhered to at least a visible surface of the frame, wherein the color of the color component is different from the color of the frame;
   wherein said body of synthetic polymer material having said reinforcement elements and said plurality of voids therein provides a composite composition which when formed into said plurality of legs is sufficiently weight bearing for supporting an occupant on said seat portion.

26. The article of claim 25, wherein said body has an irregular planar surface.

27. The article of claim 26, wherein said irregular planar surface includes pits therein.

28. The article of claim 25, wherein said synthetic polymer component comprises the same synthetic polymer as said synthetic polymer material of said body.

29. The article of claim 25, wherein said synthetic polymer component comprises a different synthetic polymer than said synthetic polymer material of said body.

30. The article of claim 25, wherein said seat portion and said backrest portion each comprise a panel woven from a plurality of synthetic polymer yarns.

31. The article of claim 25, wherein said elements comprise fibers.

32. The article of claim 25, wherein said frame has the shape of a chair and forms sidearms for said chair.

33. The article of claim 25, wherein the plurality of voids reduces the weight of said frame by about 10% or greater.

34. The article of claim 25, wherein at least a portion of said synthetic polymer material comprises recycled synthetic polymer material having said reinforcement elements dispersed therein and said plurality of voids therein.

35. The article of claim 25, wherein said seat portion and said backrest portion each comprise a panel woven from a plurality of synthetic polymer yarns, wherein said elements comprise fibers, wherein said frame forms sidearms for said article, wherein the plurality of voids reduces the weight of said frame by about 10% or greater, and wherein at least a portion of said synthetic polymer material comprises recycled synthetic polymer material having said reinforcement elements dispersed therein and said plurality of voids therein.

36. The article of claim 25, wherein said frame has a rectangular cross-section.

* * * * *